United States Patent
Wu

Patent Number: 5,163,309
Date of Patent: Nov. 17, 1992

[54] AUTOMOBILE STEERING LOCK

[76] Inventor: Wen-Yin Wu, 8th Floor, Room 2, No. 22 Chung Chen 2rd Rd., Kaohsiung City, Taiwan

[21] Appl. No.: 879,338

[22] Filed: May 7, 1992

[51] Int. Cl.⁵ .............................. B60R 25/02
[52] U.S. Cl. ........................... 70/209; 70/226
[58] Field of Search ............... 70/209, 211, 212, 225, 70/226, 237, 238

[56] References Cited

U.S. PATENT DOCUMENTS

| | | | |
|---|---|---|---|
| 4,134,282 | 1/1979 | Callahan | 70/212 |
| 4,882,920 | 11/1989 | Wu | 70/226 X |
| 4,982,810 | 1/1991 | Toy | 70/237 X |
| 5,025,646 | 6/1991 | Waguespack, Jr. | 70/209 |
| 5,097,685 | 3/1992 | Lien | 70/226 X |

FOREIGN PATENT DOCUMENTS 2443946  8/1980  France ........................ 70/238

Primary Examiner—Lloyd A. Gall
Attorney, Agent, or Firm—Bacon & Thomas

[57] ABSTRACT

An anti-theft device for attachment to a steering wheel of an automobile comprising a U-shaped solid pressing rod, two vertical elongated pinching plates welded in parallel with two ends of the U-shaped rod, a socket having a passageway for an insertable lock to insert therein and a insertable lock having one or more elastically retractable projections and an extensible rod. The two vertical pinching plates are placed to pinch a portion of a steering wheel of an automobile and the lock is to be inserted in the passageway in the socket, with the projection(s) engaging the notch(es) in the end surface of the socket and the end of the extensible rod engaging the through hole in the rear pinching plate to lock this device by turning a key inserted in the lock.

4 Claims, 2 Drawing Sheets

AUTOMOBILE STEERING LOCK

BACKGROUND OF THE INVENTION

Anti-theft devices which attach to an automobile steering wheel have been in use for a long time, having different structure to attain the object. One main structure has an elongated body member having a passageway for an elongated rod member to extend adjustably in the body member. The rod member is adapted to move in telescoping fashion in the passageway of the body member along the axis, for two hooks to engage the inside portion of the steering wheel and the rod member is locked stationary at any of a plurality of positions so as to prevent the steering wheel from being rotated.

Another structure has an elongated body member with one of its ends attached to a steering wheel and the other of its ends extending to some place in an automobile to prevent the steering wheel from being rotated.

Another structure has a curved plate with one of its ends attached to a steering wheel, the plate body passing through the steering wheel and the other of its ends extending on a gauge panel board to prevent the steering wheel from being rotated.

The first and second devices cannot completely hamper a steering wheel from rotation, and can allow it to move up and down, so particular consumers may be unable to be satisfied with such devices.

The third one can limit a steering wheel to rotate in a scope smaller than the first and the second ones, but has comparatively large dimensions to operate, and in addition, the curved extending portion of the curved plate is liable to be straightened to be broken.

SUMMARY OF THE INVENTION

This invention has been improved to have a simpler structure than the conventional anti-theft devices just mentioned, having more perfect locking effectiveness to keep the steering wheel immovable.

The anti-theft device for attachment to a steering wheel of an automobile in the present invention comprises a U-shaped solid rod, two vertical elongated pinching plates welded in parallel with two ends of the U-shaped pressing rod and a insertable lock to be inserted in a socket affixed with the front vertical pinching plate. The two pinching plates are to be placed to pinch a portion of a steering wheel of an automobile, and the bent corner portion of the U-shaped rod is to be placed just on a gauge panel board, and the insertable lock is to be inserted in the socket for locking this anti-theft device on the steering wheel by an extensible rod to be extended out of the insertable lock to have the rod end engage in a through hole in the rear vertical pinching plate by turning a key in the lock, and one or more extensible projections in the insertable lock to engage one or more notches in an end surface of the socket for locking this device.

DETAILED DESCRIPTION OF THE INVENTION

Figure 1:
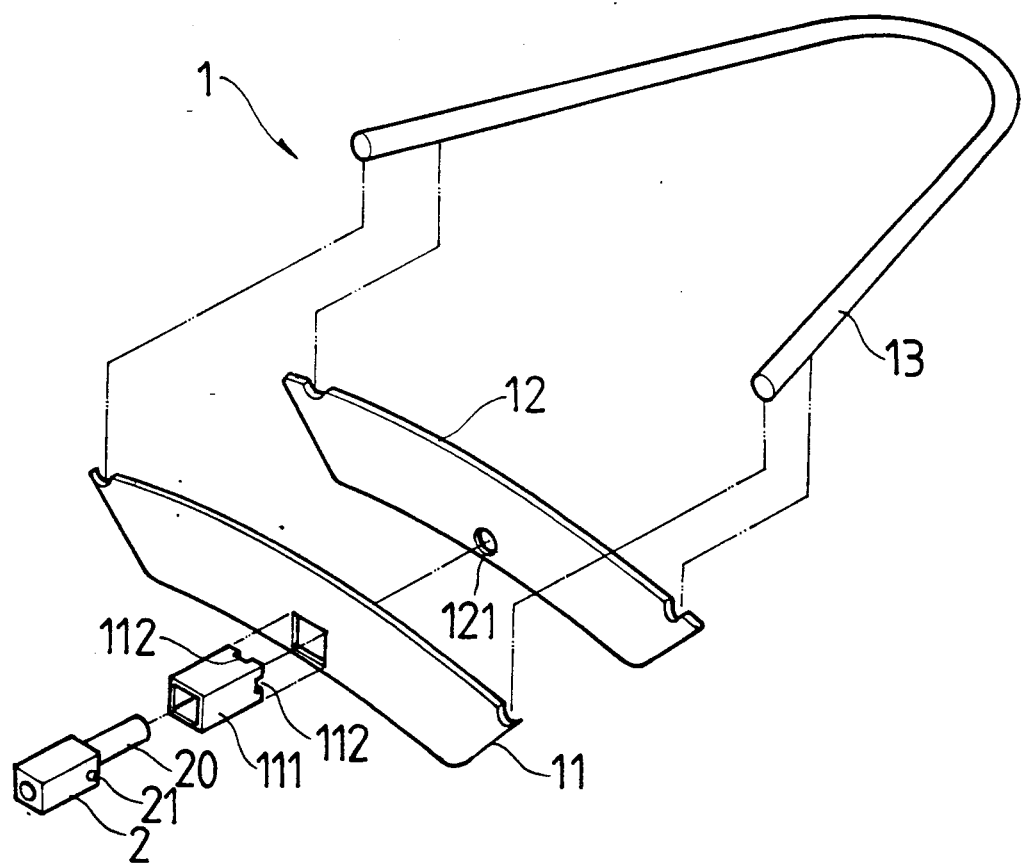
FIG. 1 is an exploded perspective view of the automobile in the present invention.
Figure 2:
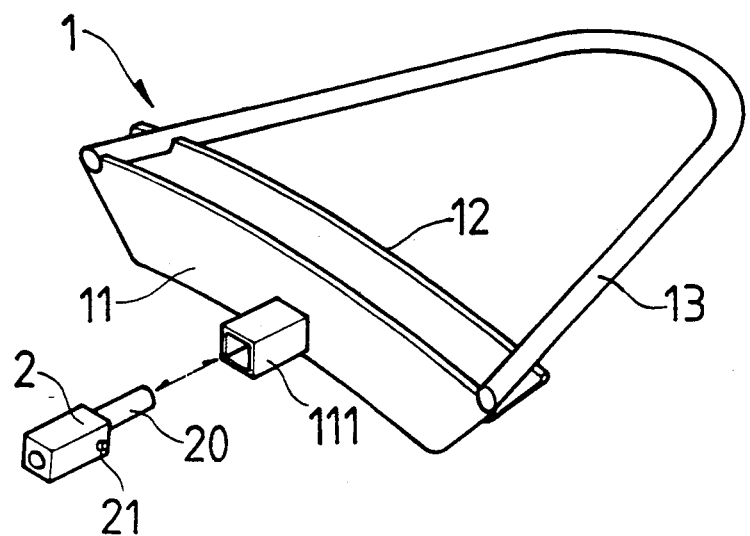
FIG. 2 is an perspective view of the automobile steering lock in the present invention.
Figure 3:
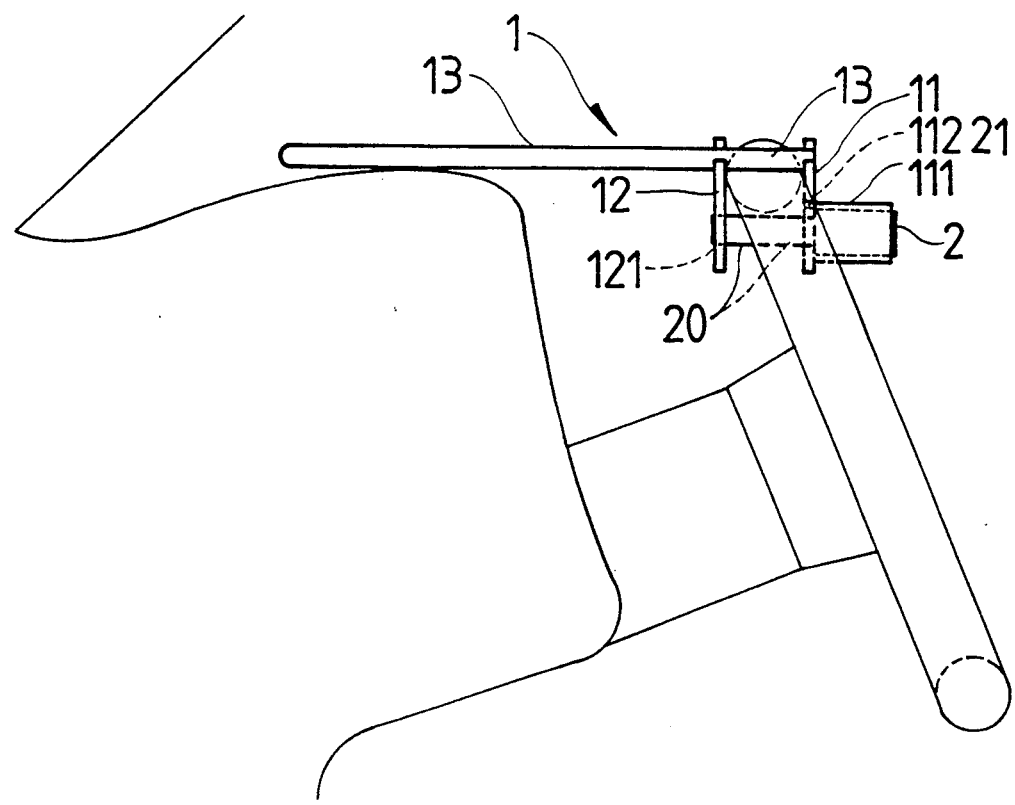
FIG. 3 is a side view of the automobile steering lock practically locked on a steering wheel of an automobile in the present invention.

The automobile steering lock in accordance with the present invention comprises a body 1 and a lock 2. The body 1 is made of a solid hard material, which can resist shearing or sawing.

The body 1 consists of two vertical elongated pinching plates 11, 12 of the same size and form and a U-shaped pressing rod 13 welded together on the upper surfaces of the two pinching plates 11, 12. The pinching plates 11, 12 are positioned vertically and in parallel and have curves side surfaces to correspond to a curvature of a steering wheel so as to be placed pinching a portion of a steering wheel. The front pinching plate 11 has a socket hole in the middle lower portion to fix firmly a socket 111 with the front pinching plate 11. The socket 111 has one or more notches 112 in the inner end surface for one or more locking projections 21 in an insertable lock 2 to engage therein to lock the lock 2 on the pinching plate 11. The notch 112 in the socket 111 is just positioned in a wall of the front pinching plate 11, having the same depth as the thickness of the plate 11 that the projection 21 cannot be seen from the outside after the lock has been locked with the plate 11, hiding within the wall of the plate 11 and preventing the lock 2 from illegal breakage. The rear pinching plate 12 has a through hole 121 in the middle lower portion correspondingly to be inserted by the end of an extensible rod 20 of the lock 2.

The lock 2 has an extensible rod 20 to extend out of a rear end of the lock 2, and the extensible rod 20 is to be extended out or in the lock 2 by a key. The projection 21 can elastically protrude out of the lock 2 without using a key, but it cannot be retracted back in the lock 2 without a key once protruding out in the notch 112. Therefore, this steering lock can be locked only by pushing the lock 2 in the socket 111 to let the projection 21 engaging the notch 112 in the socket 111, and the extending rod 20 engaging the hole 121 in the rear pinching plate 12. The extensible rod 20 has a length enough to extend out of the lock 2 to have its end inserting in the hole 121 in the rear pinching plate 12, so after the two pinching plates 11, 12 are placed pinching a portion of a steering wheel of an automobile and the key is rotated to lock this lock, extending the rod 20 out of the lock 2 under the steering wheel to insert in the hole 121 to hamper this lock from being pulled upward to disengage form the steering wheel. And the bent corner portion of the U-shaped rod 13 is to be positioned just on a gauge panel board of an automobile, preventing the steering wheel from rotating, without any possibility of being stolen.

What is claimed is:

1. An anti-theft device for attachment to a steering wheel of an automobile comprising;
   a substantially U-shaped solid pressing rod having both ends welded on two pinching plates and a bent corner portion to extend on a gauge panel board in an automobile;
   said two pinching plates having their side surfaces curved to conform to a curvature of a steering wheel, a front pinching plate having a hole in the middle lower portion for a rear end of a socket to fit and be affixed firmly therein, a rear pinching plate having a through hole in the middle lower portion for an end of an extensible rod in a lock to fit therein;

said lock having the same form as an interior hollow passageway in said socket affixed with said front pinching plate so as to be pushed in said socket in locking this anti-theft device, said lock having one or more projections extending elastically out of its outer surface, and said extensible rod to extend into said through hole in said rear pinching plate when this device is locked by a correct key;

said socket having one or more notches for said projection(s) in said lock to engage in locking a steering wheel.

2. The anti-theft device for attachment to a steering wheel of an automobile as claimed in claim 1, wherein said two pinching plates can be placed to pinch a portion of a steering wheel of an automobile for locking this device on the steering wheel.

3. The anti-theft device for attachment to a steering wheel of an automobile as claimed in claim 1, wherein said extensible rod in said lock has a length longer than the distance between said two pinching plates.

4. The anti-theft device for attachment to a steering wheel of an automobile as claimed in claim 1, wherein said extensible rod has a cross-section the same as the shape of said through hole in said rear pinching plate.

* * * * *